Nov. 15, 1966  H. SVANOE  3,285,026
FREEZE CRYSTALLIZATION OF SALINE WATER BY INJECTING
AN AQUEOUS EMULSION OF ORGANIC REFRIGERANT
AND SULFONATED SURFACTANT
Filed Aug. 24, 1964  2 Sheets-Sheet 2
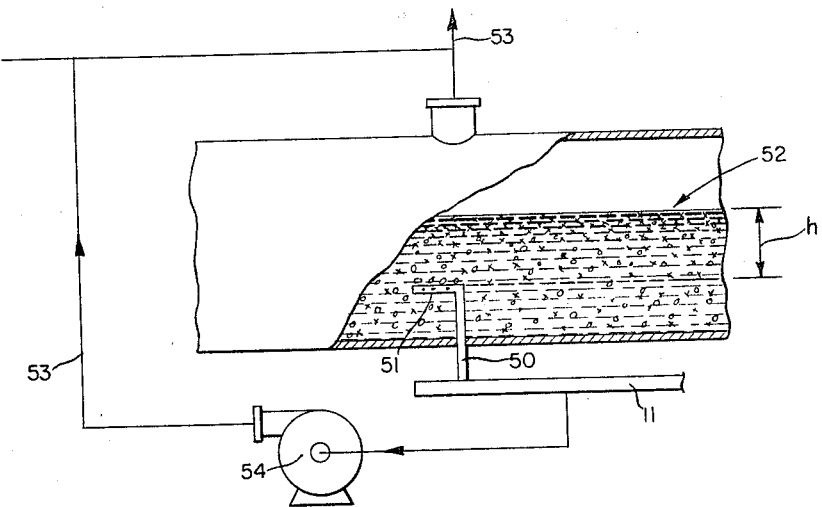
*Fig. IV*
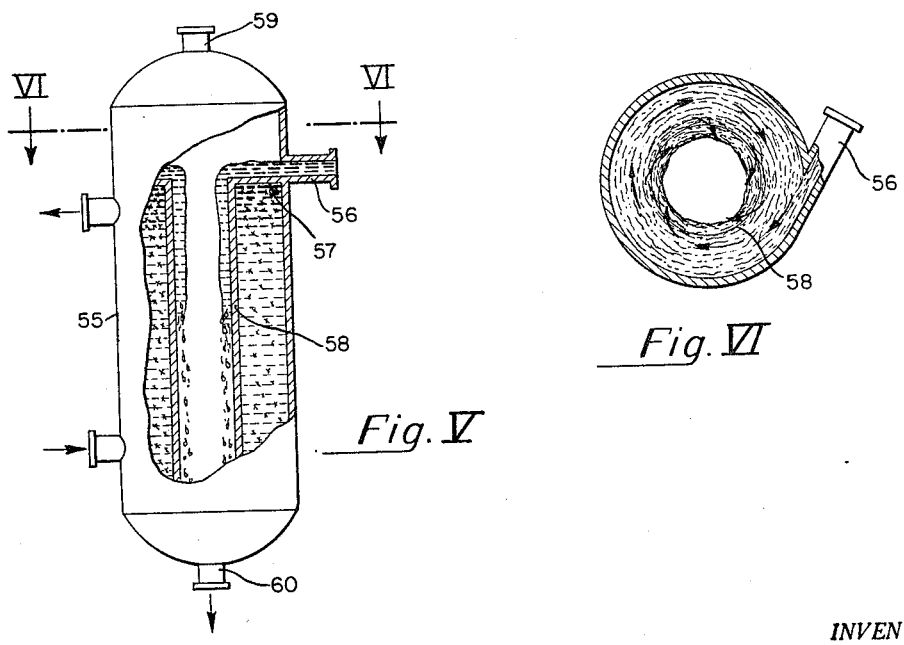
*Fig. V*   *Fig. VI*
INVENTOR.
HANS SVANOE
BY
ATTORNEY

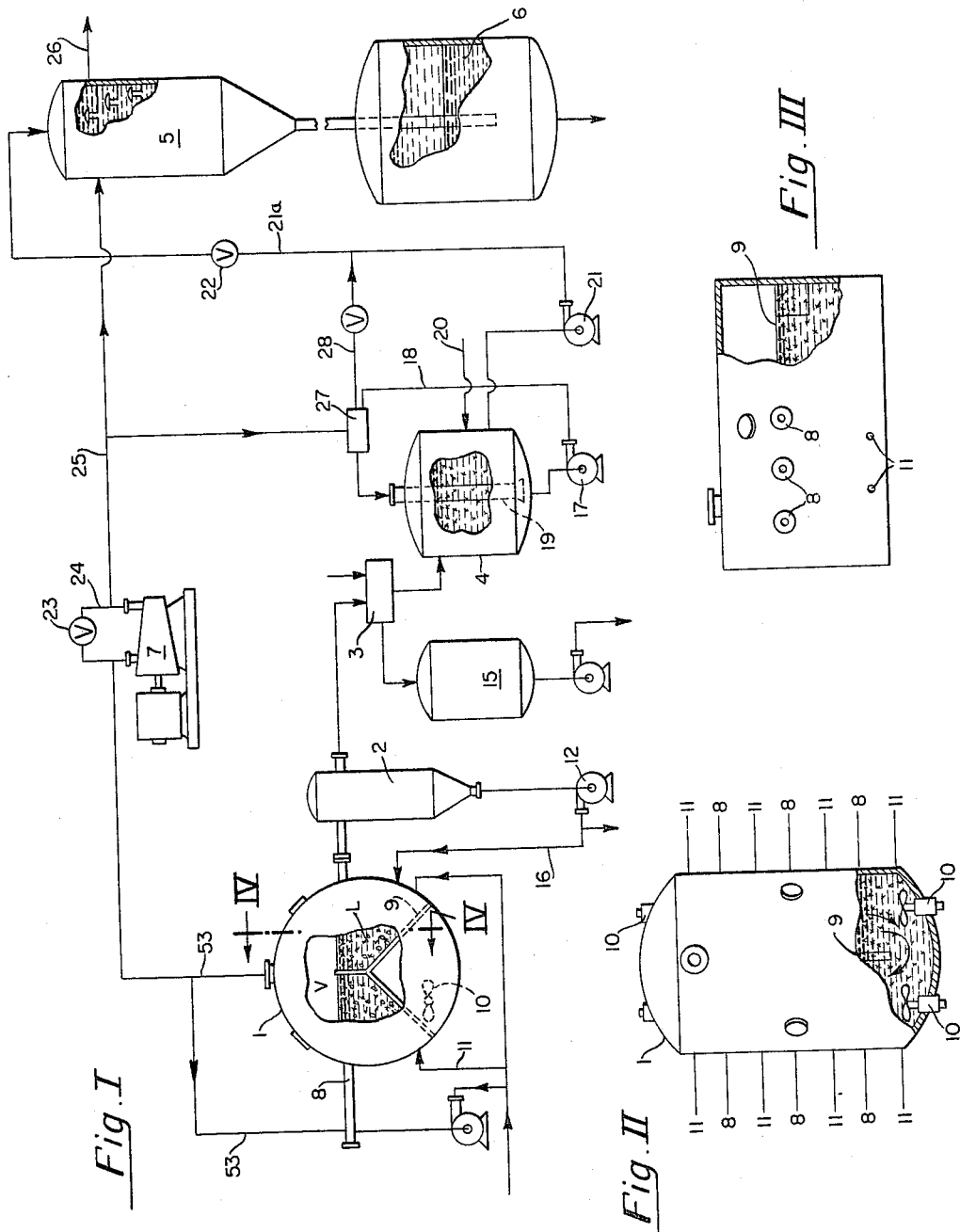

United States Patent Office 3,285,026
Patented Nov. 15, 1966

3,285,026
FREEZE CRYSTALLIZATION OF SALINE WATER BY INJECTING AN AQUEOUS EMULSION OF ORGANIC REFRIGERANT AND SULFONATED SURFACTANT
Hans Svanoe, Warren, Pa., assignor to Struthers Scientific and International Corporation, New York, N.Y., a corporation of Delaware
Filed Aug. 24, 1964, Ser. No. 391,782
6 Claims. (Cl. 62—58)

This invention relates to a process for saline water conversion and is more particularly related to such a process in which the conversion is affected by an improved freezing process. This application is in part a continuation of U.S. applications S.N. 43,827 filed July 19, 1960, S.N. 80,404 filed January 3, 1961, and U.S. Patent 3,098,734 issued July 23, 1963.

The treatment of saline water, for purification to practically brine-free water, has been carried out by many different processes of the prior art, none of which however, has produced fresh water at a sufficiently low cost for extensive use. Because of present and prospective water shortages throughout the world, processes for low-cost saline water conversion are at the present time being intensively studied. Of the many processes under study, conversion by freezing has been conceded by a number of careful investigators as being at all odds the most practicable for the lowest cost process. The present invention comprises an improved means of producing ice crystals of optimum size and habit for processing whereby fresh water at a low cost per gallon is produced.

Objects of the invention include: an improved process for the conversion of saline water to fresh water; the utilization of a prescribed saline water hydraulic head to augment crystal formation, the homogenization and/or emulsification of the refrigerant to facilitate crystal growth, the correlation of crystal size with refrigerant droplet volume and the control of refrigerant temperature throughout the process. Other objects and advantages of the invention will hereinafter appear.

The invention will be more readily understood by reference to the drawing in which like parts have like numbers throughout.

FIGURE I illustrates diagrammatically equipment used in the process of the invention in which saline water is converted by freezing to potable water. This drawing constitutes a flow sheet of the course taken by the brine, ice and refrigerant through the process. FIGURES II and III show diagrammatically details of the crystallization vessel, in which ice is formed by evaporation of a suitable refrigerant, and the means used for introducing the refrigerant into that vessel. FIGURE IV represents a partially cutaway view from IV—IV of vessel I of FIGURE I and shows in detail the flow of fluids and slurry. FIGURE V illustrates a partially cutaway view of falling film condenser and FIGURE VI represents a horizontal cross-sectional view generally along VI—VI of FIGURE V.

The saline water, sea-water or other brine containing liquid, is subjected to evaporative-crystallization with a suitable refrigerant in crystallizer 1, the ice-brine slurry is thickened in decanter 2, the ice separated from the brine in centrifuge 3 and after suspending (of ice and liquid refrigerant and/or ice, liquid refrigerant and water) in tank 4, or otherwise treated as described below, the water (as ice) now reduced in salt content is separated from refrigerant in the condenser 5 and separator 6. Vapors of the refrigerant are drawn by compressor 7 from the crystallizer 1 compressed and passed into condenser 5 for liquification.

More specifically the process of the invention is conducted by passing saline water, and more specifically a sea water, precooled, by any suitable means not shown, to about 32° F. into the crystallizer 1 through one and preferably a plurality of inlets 8 (cf. also FIGS. II and III). The crystallizer 1 is provided with a central baffle 9, an inverted Y in cross section, the divided section of the Y extending to the ends of crystallizer 1, the single section of the Y extending through the mid-portion of the crystallizer leaving a space at both ends for the flow of liquid. Propellers 10 or other suitable device are provided to give turbulent and a circular flow of the liquid around the chamber liquid space L provided by the enclosed space between the extended Y shaped baffle 9 and the walls of the crystallizer 1. Saline water fills the chamber with little or no flow of liquid over the top of the baffle 9. A refrigerant in the liquid phase, and under suitable pressure and temperature to attain that phase, under the hydraulic head of the saline water, is introduced through inlets 11 into the liquid space L and preferably into the constricted space confined between the lower extremities of baffle 9 and the walls of the crystallizer.

The refrigerant as it is introduced into the liquid in space L is introduced with a suitable pressure in excess of that superimposed by the hydraulic head of saline water in space L. Droplets of the refrigerant are formed as the refrigerant passes from inlets (which may be in the form of a suitable nozzle, cf. FIG. IV), into the liquid circulating in space L. The refrigerant evaporates as the droplets rise, pass through the saline water and cool the water to give a slurry ice-brine mother liquor. The circulation induced by the propellers 10 and the injection of the saline water and refrigerant, the shape of the crystallizer 1 and the upflow of refrigerant, inter alia, form a turbulent suspension of refrigerant droplets in the liquid space L which will be more fully characterized hereinafter.

From the liquid space L of crystallizer 1 an ice-mother liquor slurry is passed into a slurry thickener tank 2. In tank 2 a partial separation of brine mother liquor from ice is effected, the mother liquor being returned through line 16 by pump 12 to crystallizer 1 and the partially mother-liquor-free ice is charged to centrifuge 3 (which is continuously or intermittently operated). The mother liquor separated from the ice in centrifuge 3 is passed to the mother liquor tank 15 and then to waste, after heat exchange with raw saline water or other suitable utilization of its low heat content.

The ice continuously or intermittently discharged from centrifuge 3 is dispersed in suspension tank 4 preferably with the liquid refrigerant by means of circulation provided by pump 17 circulating line 18 and suitable devices such as pipe 19. Liquid refrigerant and/or water at or slightly above ice temperature is fed by line 20 into tank 4 in suitable amounts to give a dispersion of the ice crystals. The slurry from tank 4 is transferred by pump 21 and line 21a to the top of condenser 5.

The ice and slurry from tank 4 condense the compressed refrigerant from compressor 7 in condenser 5, the liquification melting the ice, and the liquid refrigerant and resulting water passed to decanter 6 wherein the liquid refrigerant and water are separated, the refrigerant being returned to storage under suitable temperature and pressure to maintain its temperature and liquid phase state and the water, after heat exchange to utilize its reduced specific heat content, sent to product storage, not shown.

Temperature of the crystallization in the liquid space L is maintained by the vapor pressure of the refrigerant in the vapor space V above the circultaing slurry. More specifically, control of the temperature by the pressure is accomplished by the pressure controlled by compressor 7 which is preferably operated by a variable speed prime mover used in conjunction with the by-pass valve 23 in line 24. Condensation of the refrigerant vapors in the condenser 5 results in a pressure drop. Due regulation of the compressor with the by-pass valve 23 affords a convenient means of controlling the degree and constancy of the temperature in the crystallizer 1.

Condenser 5 which is a barometric condenser is provided with any suitable slurry hold-up device well known in the art for providing contact of crystals with liquors and vapors. Those shown in the drawing are exemplary and for purposes of illustration. Uncondensed refrigerant is withdrawn from condenser 5 through line 26 to a secondary compressor and condenser system for recovery. Separator 6 effects by decantation the separation of the refrigerant from the water. If the refrigerant has a specific gravity above 1.00 it, of course, will be withdrawn from the lower layer and the water from the upper layer of the separator 6 and vice versa if the specific gravity is less than 1.00.

The fluidization and/or dispersion of ice in tank 4 is facilitated by the addition of a moderate amount of heat to the circulating slurry in line 18 which may be accomplished by any suitable means such for example as by heat exchange in heater 27 with refrigerant from line 25, the refrigerant then passing through line 28 to line 21a and condenser 5.

If desired some displacement of mother liquor from the crystals formed can be effected by spraying the crystals in centrifuge 3 with saline water having a reduced salt content and/or with a liquid refrigerant. A part of the mother liquor can be added to the system as a displacing liquor or as a spray directly on the centrifuged crystals, to lower the brine concentration in surface contact with the ice. In carrying out this operation the displacing fluid may be heated to cause superficial melting on the ice surface and also to avoid agglomeration of ice particles.

Any refrigerant having a specific gravity, preferably below 1.00 at 20°C., a suitably high latent heat of evaporation in crystallizing ice from sea water under the temperature and pressure of the process of the invention may be used. The preferred refrigerants are liquids, at absolute pressures above 300 mm. of Hg at the temperature of crystallization in crystallizer 1, that are relatively insoluble in water at around 0°C. i.e. they have a solubility of less than about 0.5 gr. of refrigerant per 100 grs. of water. Examples of suitable refrigerants for this purpose are alkyl halides e.g. ethyl chloride, butyl chloride, and the other low specific gravity, relatively low boiling hydrocarbon halides. The low boiling saturated and unsaturated hydrocarbons such as normal and iso-propane, normal and iso-butane, the normal and iso-butanes and equivalent readily liquifiable hydrocarbons are preferred.

FIGURE IV shows means for providing the proper refrigerant droplet volume and temperature during injection into the flowing stream of saline water, when the process is on-stream. The refrigerant from header 11 is forced into distributor pipe 50 and through the orifice or orifices 51 which have been formed in the pipe and which have a prescribed diameter (more fully described hereinafter). The hydraulic head $h$ of saline water, i.e. height of the saline water interface above the orifices 51, is an important factor in regulating the vaporization of the refrigerant, and concomitantly, the rate of formation and the granular habit and form of the ice crystals. The turbulence of the slurry as it passes by the distributor pipe 50 and its orifice 51 assists in dispersing the droplets uniformly throughout the slurry. The temperature of the refrigerant, the pressure superimposed in the vapor space above the liquid-vapor interface 52, the droplet volume, and the hydraulic head $h$ are so adjusted and arranged that as the droplets rise in the slurry they vaporize at a rate such that they reach the interface 52 at close to equilibrium temperature with the saline water thereby assuring maximum efficiency of compression.

Considerable care should be exercised in operating the process to ensure that the temperature of the refrigerant and more practically the external temperature of the distributor pipe or pipes 50 or like means of introducing the refrigerant are not so low as to cause a freeze up at the point of entry of the refrigerant. To avoid such an undesirable result, in addition to a prescribed hydraulic head, a refrigerant return line 53 is used to feed refrigerant vapors from the vapor space V through compressor 54 into header 11 in such amounts as to provide precise control of refrigerant temperature.

FIGURE V provides an alternate means for pretreating the refrigerant prior to introducing it into the slurry. This means comprises a falling film condenser 55. Into the condenser cooled sea water, for example, is introduced through inlet 56, at such an angle (cf. FIGURE VI) and at such a velocity that the sea water is given a swirling motion by the walls and around horizontal surface 57, the sea water flows over the edge of the surface 57 and falls down the inner walls of vertical surface 58 of the condenser. Compressed refrigerant in the vapor is introduced into the condenser 55 through inlet 59, is caught by swirling sea water and also falls down the vertical walls commingling with the falling and cooling film of sea water. The refrigerant vapors, as they enter condenser 55 are at a sufficiently high pressure to result in their liquification at the sea water temperature as that water is cooled by the coolant flowing in the cooling jacket of condenser 55. The refrigerant is thus dispersed as droplets or condensed and dispersed as droplets in the sea water which product is discharged from the condenser 55 through outlet 60. Contrariwise an emulsion of the refrigerant, in the liquid phase, may be produced in saline water by any suitable means and then employed in the process of the invention. The refrigerant emulsified in the sea water is then passed into header 11 (cf. FIG. I). A dispersion or emulsion of the refrigerant can be used having any desired ratio of brine to refrigerant; recommended ratio is from 5 weight percent to 50 weight percent of the refrigerant.

The pressure and temperature on the condenser 55 contents should be maintained such that there is no freezing of the saline water. Moreover, the resulting product of the condenser 55 should be maintained under suitable temperature and pressure (well known to those skilled in the refrigerant art) while the product is being transported to the distributor pipe 11 to provide a liquid under the hydraulic head previously described. A coolant such for example as the slurry from the tank 4 or any other suitable coolant is passed through the outer jacketed surfaces of 57 and 58 to provide the desired temperature control in the falling streams of sea water. By the use of slurry from tank 4 the temperature in the jacket will be the same as the melting temperature of ice, i.e. 0° C., and the brine temperature will be from plus 2°C. to plus 10° C.

The refrigerant is injected into the saline water in accord with the invention to give on the one hand the desired crystal size and habit and on the other a continuous uninterrupted process. To accomplish the first purpose it has been found that the refrigerant should be present in the saline water as discrete droplets having a prescribed average size. To accomplish the second purpose the injection of refrigerant is effected at a rate, location and state that will avoid freeze up in the vicinity of the point of refrigerant introduction.

The refrigerant is introduced directly into the brine/ice slurry in the crystallizer 1, as droplets, or immediately after the introduction of the refrigerant it is transformed from a contiguous liquid to droplets, in situ. The droplet may be provided by any suitable means such for example as by injecting the refrigerant through an aperture or nozzle of a prescribed size. The liquid is drawn by an aperture that forms a slender stream or filamentary shape, which shape, as injected into the saline water, is unstable and being under slight displacement will neck down in places and bulge in others, thereby collapsing into droplets. Another means is to emulsify or disperse the refrigerant in a non-solvent for the refrigerant and thereafter inject the thus formed droplets into the saline water (cf. FIGURE V). The dispersion and/or emulsification can be effected with or without the use of an emulsifying agent such as the sulfonated long chain hydrocarbons, the emulsification being carried out in saline water to give from 10% to 50% by weight of the refrigerant in the saline water or other medium, the resulting concentrate being injected into the saline water undergoing refrigeration through the apertures described previously. A dispersing agent and/or emulsifier and like extenders as fluids are herein and in the claims referred to as refrigerant extenders.

To accomplish the second purpose, the refrigerant is evaporated from a liquid to a vapor at a controlled rate. This control is accomplished, inter alia, by the hydraulic head of saline water. The droplets, mentioned above, should neither be permitted to evaporate too rapidly nor too slowly. Rapid evaporation results in the formation of an excessive endothermic heat effect at the point of injection and despite a rapid flow of the saline water past the point of injection may cause a freeze-up at that point. Slow evaporation unduly retards over-all plant capacity. Optimum operation involves the gradual dissipation of the droplet from its original drop volume to zero drop volume i.e. to a vapor. The theoretical operation to be approximated is the formation of the desired droplet size at the point of injection and the dissipation of the droplet volume as the droplet passes up through the saline water under conversion, the dissipation from a droplet to a vapor state being effected at substantially the interface of the saline water. It has been found by extensive research that if the droplet rises to the surface of the saline water, poor nucleation and also decrease in efficiency occurs because of the supernatant film of the refrigerant that forms.

In accordance with the prior art methods of refrigeration considered attention has been given neither to the control of droplet size nor to the effects of the hydraulic head of the saline water on the control of the droplet size as the former passes up through the saline water-ice slurry. Another feature of the invention is the maintenance of a proper hydraulic head of saline water to effect the dissipation of the droplet at or near the surface of the brine-ice slurry. The invention however is not to be limited to a precise hydraulic head to give the aforesaid result but includes a hydraulic head that will inhibit freeze-up at the point of injection, will prevent the formation of a supernatant layer of the refrigerant and will be sufficient to inhibit coalescence of the droplets to drops of larger size in the freezing slurry.

The hydraulic head to accomplish the aforesaid will vary somewhat with the specific gravity of the saline water under conversion and the temperature and pressure on the system. Generally speaking the hydraulic head should be maintained to effect the aforesaid results and to produce granular, commercially filterable and washable ice crystals between 6″ and 36″ and preferably between 8″ and 20″ above the point of injection of the refrigerant. The optimum operation of the process of the invention is effected by using a refrigerant, such as butene, and injecting such a refrigerant into precooled saline water, the refrigerant having, at the point of injection a pressure of 900 to 1100 mm. of Hg, the saline water having at the point of injection of the refrigerant the hydraulic head previously described.

It has also been discovered that when conditions are provided by external temperature and pressure imposed on the vapor above the freezing zone that boils the butene at 25°F. at the crystallizer brine slurry interface and the liquid level from this point to the butene inlet is 24″, then the butene will boil at that inlet at 28°F. Under these conditions a 3°F. temperature difference will exist between the introduction of the liquid butene and its discharge as vapor from the surface of the slurry. Conditions, however, that will restrict the temperature of the butene, or other refrigerant, to no more than 5°C. and preferably below about a 3°F. temperature range between its injection into and discharge from the saline water under refrigeration will produce superior ice crystals.

Effective crystallization was obtained by the conversion of sea water, in accordance with a preferred embodiment of the invention, whereby the ice formed as particulate particles having an average crystal size of 1.0 mm. Sea water was introduced into crystallizer 1 at a temperature of 28.3°F., liquid butene being at a temperature above 32°F. was injected, into the sea water, under a hydraulic head of 22″ of the sea water, and boiling at 26°F., the butene being injected through an orifice having a discharge diameter of about 0.7 mm. In the upper portion of the crystallizing sea water-ice slurry, the butene had a temperature of 23.5°F. The temperature differentials between the sea water and the boiling butene accordingly ranged between 2.3°F. and 4.8°F. The butene vapors were discharged from the crystallization zone 1 through the vapor discharge line 53, the vapors having a temperature of 28.3°F.

It has also been discovered that the process gives crystals in granular form, of the hexagonal system and of the ditrigonal-pyramidal class, they have four axis; three a-axis, in the horizontal plane of substantially equal length with angles of 120° between the positive ends and a vertical axis, these crystals have a diameter of 0.5 mm. to 1.5 mm. and are producible if droplets of refrigerant are used having an initial drop diameter between 1.5 mm. and 0.1 mm. and preferably between 0.75 and 0.25 mm. It was most surprising to find that the droplet volume determined, it appeared, the size and granular form of the ice crystal. With droplets having the above prescribed diameters ice was produced in crystal size and form such that it could be readily separated from the brine mother liquor by filtering or by centrifuging and the separated ice could be washed brine free with ease. It was also found that the operating conditions, and particularly the hydraulic head employed and the evaporation rate of the droplet were coacting with droplet volume to give the crystal size and structure for effective economical conversion. The rate of evaporation of the refrigerant is a function of the rate at which the refrigerant picks up heat through contact with the slurry of ice and brine, the refrigerant by its latent heat of evaporation, removing from the slurry the heat of crystallization of the ice, about 145 B.t.u. per lb. of ice, plus about 35 B.t.u. as sensible heat in the feed and normal heat losses (the latter mostly picked up from heat from the surrounding atmosphere). By the vaporization, the brine temperature should be slightly lower than the ice crystals. With a driving force of about 0.2° F. additional ice will be deposited on the crystal, thereby giving off heat to the forming crystals (which the crystals then again give up to the brine). The brine freezing temperature will of course depend upon the salt concentration in the brine. The driving force for the growth of optimum crystal form, however, should be maintained at not more than about 0.2°F., i.e. temperature difference between the brine and the ice.

The rate of growth of ice crystals is proportional (in some exponential degree) to the temperature difference between the ice and brine (i.e. it approximates the degree of supercooling). Moreover, at a low temperature difference not more than about 0.2°F. regularly formed ice crystals are produced. At higher temperature differences say more than about 0.4°F. the growth is so rapid that the crystal form will be like needles or dendritic. Intricate crystal form and especially interlocked crystals which retain brine between the entwined crystals make the removal of brine next to impossible without melting the crystal, thus defeating the purpose of the process viz. the conversion of saline water to fresh water at an acceptable price per gallon.

The process and apparatus described may be modified in many ways within the purview of the invention as hereinafter claimed without departing from the invention as hereinafter claimed.

I claim:

1. In a process for the conversion of saline water to practically saline-free water by a process in which dense, compact ice crystals are formed by nucleation, crystallization and crystal growth in a saline water-ice slurry by the heat of evaporation of a liquid organic refrigerant in a heat exchange relationship with and in direct contact with the saline water, the practically saline-free water being produced by separating the ice from the resulting saline water-ice slurry and melting the separated ice, the steps which comprise injecting an aqueous emulsion of a liquid organic refrigerant into a slurry of saline water, containing ice crystals and saline water, under a hydraulic head 36″ to 36″ of saline water and having a temperature and pressure at which the liquid refrigerant vaporizes, passing the refrigerant during said injection through an orifice having an internal diameter between 0.1 mm. and 1.5 mm., whereby the liquid refrigerant emulsion enters the slurry as a filamentary shape with the internal diameter of the orifice and collapses to form droplets of the refrigerant, growing dense compact ice crystals by the latent heat of evaporation of the refrigerant droplets as they pass through the slurry, and separating the ice crystals thus formed from the slurry.

2. The process of claim 1 in which the refrigerant immediately prior to its injection into the slurry is dispersed in an extender.

3. The process of claim 1 in which the filamentary shape comprises the refrigerant and an extender therefor.

4. The process of claim 1 in which the refrigerant droplets contain the refrigerant and an extender.

5. The process of claim 1 in which the refrigerant droplets contain the refrigerant dispersed in saline water.

6. The process of claim 1 in which the emulsion contains a sulfonated long chain hydrocarbon.

References Cited by the Examiner

UNITED STATES PATENTS 3,180,102  4/1965  Torobin et al. _____ 62—58 X

FOREIGN PATENTS 217,766  9/1957  Australia.

OTHER REFERENCES

"U.S. Office of Saline Water, Saline Water Conversion Report," 1957, Rose et al., Applied Science Laboratories, Inc., page 63.

NORMAN YUDKOFF, *Primary Examiner.*

G. P. HINES, *Assistant Examiner.*

UNITED STATES PATENT OFFICE
CERTIFICATE OF CORRECTION

Patent No. 3,285,026

November 15, 1966

Hans Svanoe

It is hereby certified that error appears in the above numbered patent requiring correction and that the said Letters Patent should read as corrected below.

Column 7, line 18, strike out "36″ to 36″".

Signed and sealed this 12th day of September 1967.

(SEAL)
Attest:

ERNEST W. SWIDER
Attesting Officer

EDWARD J. BRENNER
Commissioner of Patents